United States Patent
Xie et al.

(10) Patent No.: US 10,654,076 B2
(45) Date of Patent: May 19, 2020

(54) AUTOMATIC FIBER CLEANING SYSTEM AND METHOD

(71) Applicants: Tyco Electronics (Shanghai) Co. Ltd., Shanghai (CN); TE Connectivity Corporation, Berwyn, PA (US); Shenzhen AMI Technology Co. Ltd., Guangdong (CN)

(72) Inventors: Fengchun Xie, Shanghai (CN); Qinlong Zeng, Guangdong (CN); Yu Zhang, Shanghai (CN); Dandan Zhang, Shanghai (CN); Lvhai Hu, Shanghai (CN); Roberto Francisco-Yi Lu, Berwyn, PA (US)

(73) Assignees: Tyco Electronics (Shanghai) Co. Ltd., Shanghai (CN); TE Connectivity Corporation, Berwn, PA (US); Shenzhen AMI Technology Co., Ltd., Shenzhen (CN)

( * ) Notice: Subject to any disclaimer, the term of this patent is extended or adjusted under 35 U.S.C. 154(b) by 12 days.

(21) Appl. No.: 15/897,722

(22) Filed: Feb. 15, 2018

(65) Prior Publication Data

US 2018/0169710 A1 Jun. 21, 2018

Related U.S. Application Data

(63) Continuation of application No. PCT/IB2016/054923, filed on Aug. 17, 2016.

(30) Foreign Application Priority Data

Aug. 17, 2015 (CN) .......................... 2015 1 0503975

(51) Int. Cl.
*B08B 1/00* (2006.01)
*G02B 6/38* (2006.01)
(Continued)

(52) U.S. Cl.
CPC ................ *B08B 1/008* (2013.01); *B08B 3/02* (2013.01); *G02B 6/25* (2013.01); *G02B 6/3866* (2013.01);
(Continued)

(58) Field of Classification Search
CPC ....... B08B 1/008; B08B 3/02; B08B 2240/02; B08B 11/00; B08B 1/00; G02B 6/25;
(Continued)

(56) References Cited

U.S. PATENT DOCUMENTS

| | | | |
|---|---|---|---|
| 5,469,611 A * | 11/1995 | Sasaki | .................... G02B 6/245 29/426.2 |
| 6,505,372 B1 | 1/2003 | Drozd | |
| 7,837,801 B2 * | 11/2010 | Christopher | .............. B08B 1/00 134/15 |
| 8,943,641 B2 | 2/2015 | Mahapatra et al. | |

(Continued)

FOREIGN PATENT DOCUMENTS

| | | |
|---|---|---|
| EP | 2209026 A1 | 7/2010 |
| JP | 7287124 A | 10/1995 |

(Continued)

OTHER PUBLICATIONS

Kinoshita et al. (JP2599425B2, Machine Translation, May 2019).*
(Continued)

*Primary Examiner* — Binh X Tran
*Assistant Examiner* — Christopher Remavege
(74) *Attorney, Agent, or Firm* — Barley Snyder

(57) ABSTRACT

An automatic fiber cleaning system comprises a first cleaning module, a second cleaning module, and a sprayer. Each of the first cleaning module and the second cleaning module has a cleaning belt, a driven belt wheel on which an unused portion of the cleaning belt is wound, a driving belt wheel on which a used portion of the cleaning belt is wound, and a pressing tool on which the cleaning belt is tightened. The sprayer sprays a cleaning agent onto the cleaning belts. The pressing tools press the cleaning belts on both sides of an
(Continued)

optical fiber and clamp the optical fiber. The cleaning belts move relative to the optical fiber by the driving belt wheels to wipe the optical fiber.

13 Claims, 4 Drawing Sheets

(51) Int. Cl.
  *G02B 6/25* (2006.01)
  *B08B 3/02* (2006.01)
  *G02B 6/44* (2006.01)

(52) U.S. Cl.
  CPC ......... *G02B 6/3885* (2013.01); *G02B 6/4403* (2013.01); *B08B 2240/02* (2013.01)

(58) Field of Classification Search
  CPC .. G02B 6/3866; G02B 6/3885; G02B 6/4403; A47L 1/15; A47L 25/00; B65H 57/26; B65H 75/4452; B65H 75/4471
  USPC .................................. 15/97.1, 209.1; 134/6
  See application file for complete search history.

(56) References Cited

U.S. PATENT DOCUMENTS

| | | | | |
|---|---|---|---|---|
| 2008/0034519 | A1* | 2/2008 | Fujiwara | B08B 1/008 15/104.001 |
| 2011/0047731 | A1* | 3/2011 | Sugita | G02B 6/3807 15/97.1 |
| 2012/0017384 | A1* | 1/2012 | Fujiwara | G02B 6/3866 15/97.1 |
| 2013/0185883 | A1* | 7/2013 | Murakami | A47L 1/15 15/209.1 |
| 2014/0259477 | A1* | 9/2014 | Huang | B65H 57/26 15/97.1 |

FOREIGN PATENT DOCUMENTS

| | | | |
|---|---|---|---|
| JP | 2599425 | B2 * | 4/1997 |
| JP | 2003021751 | A | 1/2003 |

OTHER PUBLICATIONS

Chinese Office Action, dated Oct. 31, 2017, 8 pages.
PCT Notification, The International Search Report and Written Opinion, dated Oct. 24, 2016, 12 pages.
Abstract of JP2003021751, dated Jan. 24, 2003, 1 page.

* cited by examiner

AUTOMATIC FIBER CLEANING SYSTEM AND METHOD

CROSS-REFERENCE TO RELATED APPLICATIONS

This application is a continuation of PCT International Application No. PCT/IB2016/054923, filed on Aug. 17, 2016, which claims priority under 35 U.S.C. § 119 to Chinese Patent Application No. 201510503975.0, filed on Aug. 17, 2015.

FIELD OF THE INVENTION

The present invention relates to an automatic cleaning system and, more particularly, to an automatic fiber cleaning system for cleaning the fibers of an optical cable.

BACKGROUND

A fiber optic connector generally comprises a housing and a ferrule assembly assembled in the housing. The ferrule assembly comprises a ferrule and optical fibers inserted into bores of the ferrule. An existing method of manufacturing the ferrule assembly typically comprises: stripping off a length of an outer coating layer of an optical cable so as to expose the length of bare fiber; cleaning the exposed bare fiber so as to remove residues on the fiber, for example, residues of the outer coating layer; inserting the cleaned bare fiber into the bores of the ferrule; and lastly, heating and curing an adhesive in the ferrule so as to secure the fiber in the ferrule.

The bare fiber is generally cleaned manually. The manual cleaning method is not efficient and it is easy to damage the bare fiber during cleaning, reducing an optical performance of the bare fiber.

SUMMARY

An automatic fiber cleaning system comprises a first cleaning module, a second cleaning module, and a sprayer. Each of the first cleaning module and the second cleaning module has a cleaning belt, a driven belt wheel on which an unused portion of the cleaning belt is wound, a driving belt wheel on which a used portion of the cleaning belt is wound, and a pressing tool on which the cleaning belt is tightened. The sprayer sprays a cleaning agent onto the cleaning belts. The pressing tools press the cleaning belts on both sides of an optical fiber and clamp the optical fiber. The cleaning belts move relative to the optical fiber by the driving belt wheels to wipe the optical fiber.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
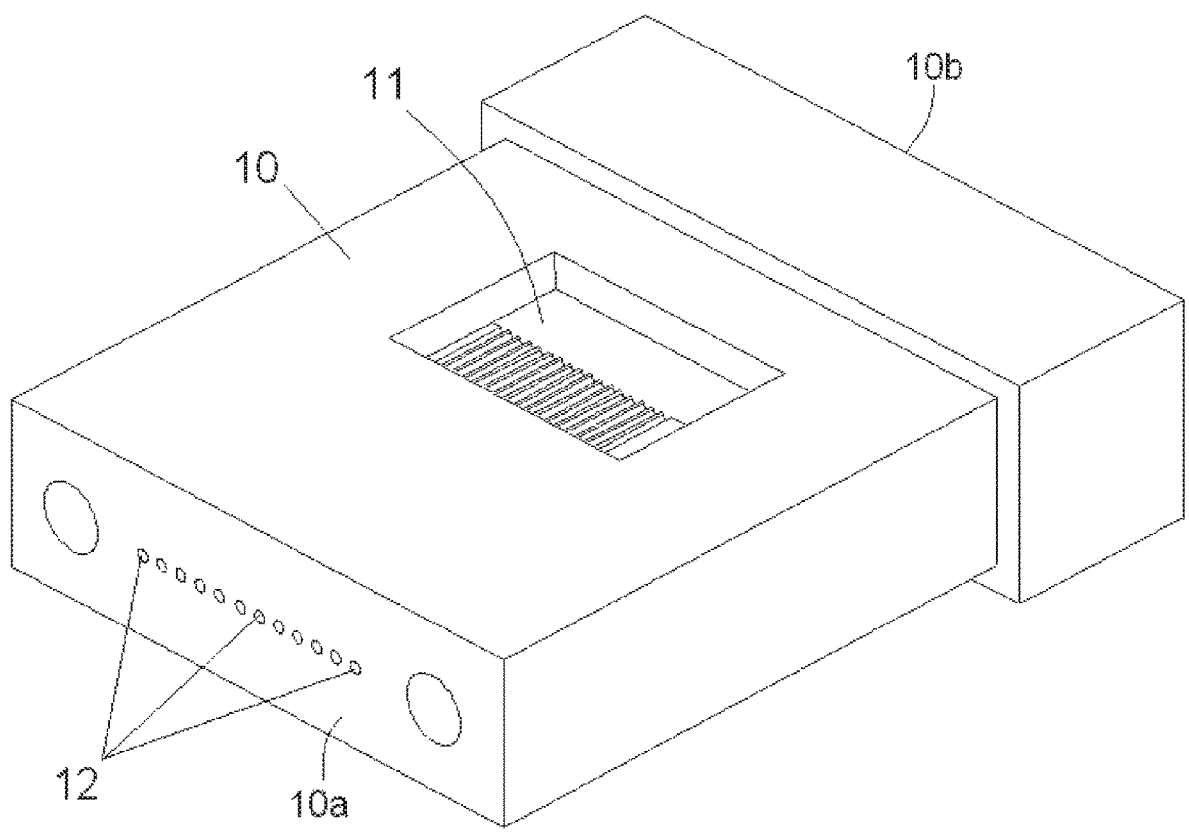
FIG. 1 is a perspective view of a multi-bore ferrule.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Figure 2:
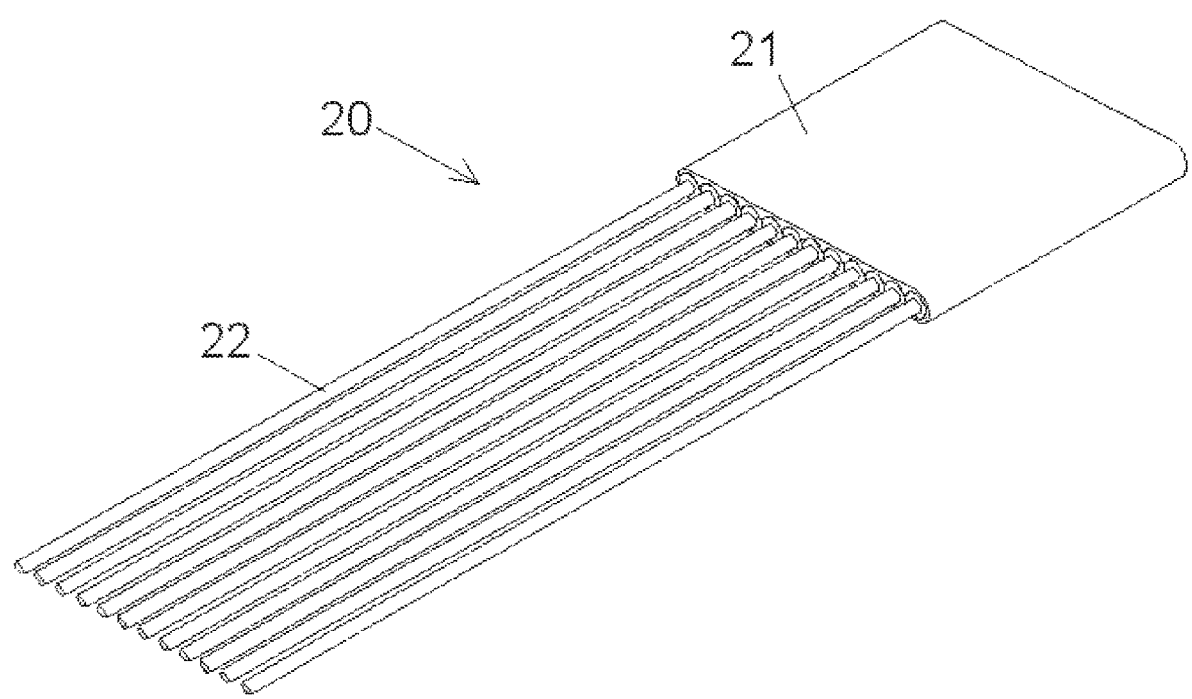
FIG. 2 is a perspective view of a ribbon cable.
Figure 3:
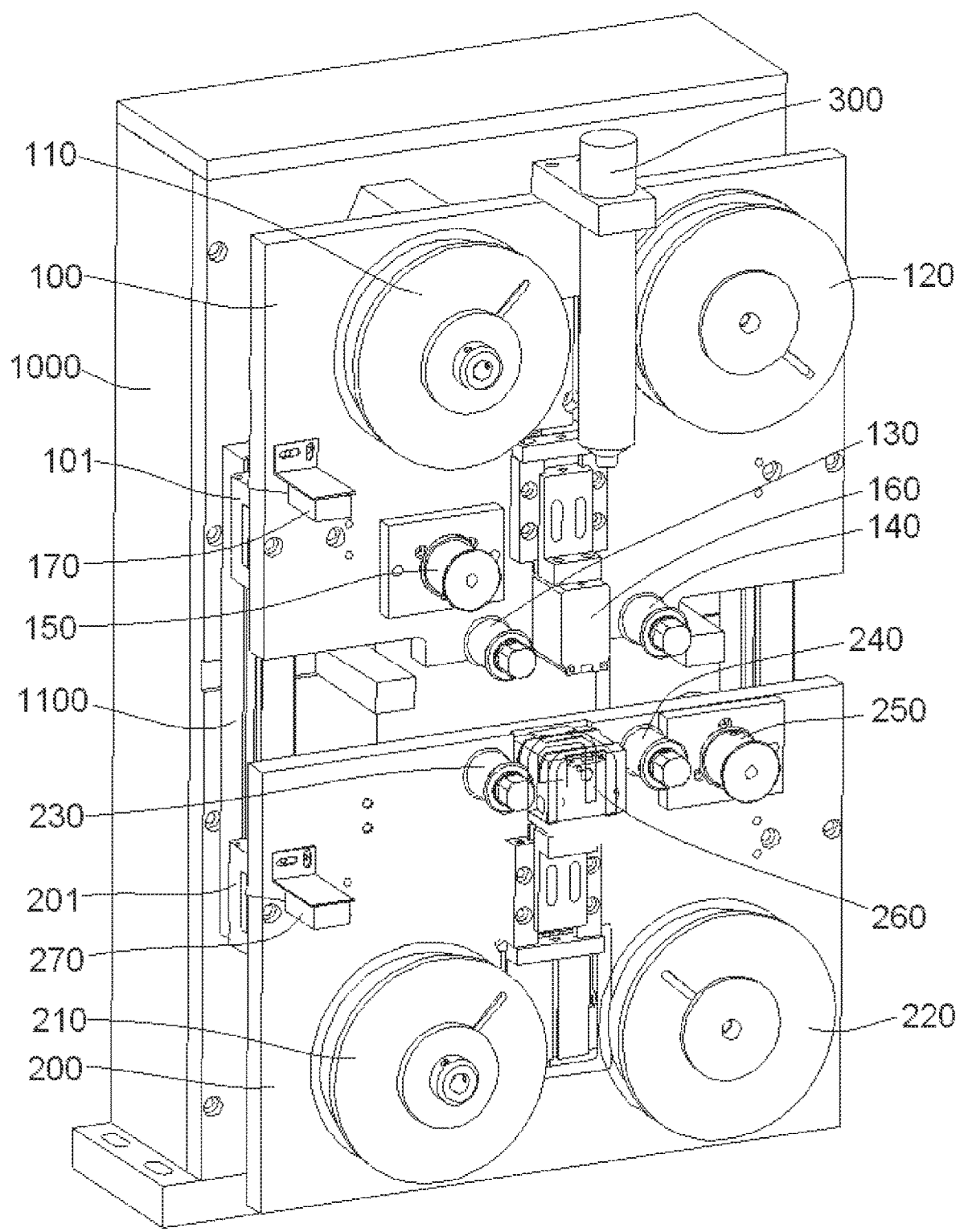
FIG. 3 is a perspective view of an automatic fiber cleaning system.

An automatic fiber cleaning system according to the invention is shown in FIG. 3. FIGS. 1 and 2 show a multi-bore ferrule 10 and a ribbon cable 20 used with the automatic fiber cleaning system.

The multi-bore ferrule 10 shown in FIG. 1 has a plurality of bores 12 extending longitudinally along the multi-bore ferrule 10 and an injection opening 11 formed on a top of the multi-bore ferrule 10.

The ribbon cable 20 shown in FIG. 2 has a plurality of optical fibers 22 and an outer coating layer 21 covering the optical fibers 22. A length of the outer coating layer 21 is stripped off so as to expose a length of the optical fibers 22.

A ferrule assembly comprises the multi-bore ferrule 10 and the ribbon cable 20. The optical fibers 22 of the ribbon cable 20 are inserted into and secured in the bores 12 of the multi-bore ferrule 10. The optical fibers 22 are inserted from an insertion port at a rear end 10*b* of the multi-bore ferrule 10 and protrude by a predefined distance from a front end 10*a* of the multi-bore ferrule 10. Surfaces of the optical fibers 22 are required to be cleaned before the optical fibers 22 are inserted into the bores 12 of the multi-bore ferrule 10.

As shown in FIG. 3, the automatic fiber cleaning system comprises a first cleaning module (also referred as an upper cleaning module), a second cleaning module (also referred as a lower cleaning module), and a sprayer 300.

The first cleaning module, as shown in FIG. 3, includes a first cleaning belt, a first driven belt wheel 120, a first driving belt wheel 110, and a first pressing tool 160. An unused portion of the first cleaning belt, a portion which has not been brought into contact with the optical fiber 22, is wound on the first driven belt wheel 120. A used portion of the first cleaning belt, a portion which has wiped the optical fiber 22, is wound on the first driving belt wheel 110. The first cleaning belt between the first driving belt wheel 110 and the first driven belt wheel 120 is tightened on the first pressing tool 160.

The second cleaning module, as shown in FIG. 3, includes a second cleaning belt, a second driven belt wheel 220, a second driving belt wheel 210, and a second pressing tool 260. An unused portion of the second cleaning belt, a portion which has not been brought into contact with the optical fiber 22, is wound on the second driven belt wheel 220. A used portion of the second cleaning belt, a portion which has wiped the optical fiber 22, is wound on the second driving belt wheel 210. The second cleaning belt between the second driving belt wheel 210 and the second driven belt wheel 220 is tightened on the second pressing tool 260. The first cleaning belt and the second cleaning belt may be a clean woven belt or any other suitable cleaning belts known to those with ordinary skill in the art.

The sprayer 300 shown in FIG. 3 is configured to spray a cleaning agent onto the first cleaning belt and the second cleaning belt tightened on the first pressing tool 160 and the second pressing tool 260. In an embodiment, the cleaning agent comprises alcohol.

The first pressing tool 160 and the second pressing tool 260 cooperate with each other to press the first cleaning belt and the second cleaning belt against both sides of the optical fiber 22, respectively, so that the optical fiber 22 to be cleaned is clamped between the first cleaning belt and the second cleaning belt. While the first cleaning belt and the second cleaning belt are driven to move relative to the optical fiber 22 by the first driving belt wheel 110 and the second driving belt wheel 210, the first cleaning belt and the second cleaning belt wipe surfaces of the optical fibers 22, so as to perform a cleaning operation on the optical fibers 22.

As shown in FIG. 3, the first cleaning module further comprises a first sensor 170 adapted to detect whether the first cleaning belt has been completely used by detecting whether the first cleaning belt has any unused portion. Similarly, the second cleaning module further comprises a second sensor 270 adapted to detect whether the second cleaning belt has been completely used by detecting whether the second cleaning belt has any unused portion. In the shown embodiment, the first sensor 170 and the second sensor 270 are visual sensors.

As shown in FIG. 3, the first cleaning module further comprises a pair of first rollers 130, 140 which are located at two sides of the first pressing tool 160, respectively, and the first cleaning belt is tightened on the pair of first rollers 130, 140 and the first pressing tool 160. Similarly, the second cleaning module further comprises a pair of second rollers 230, 240 which are located at two sides of the second pressing tool 260, respectively, and the second cleaning belt 260 is tightened on the pair of second rollers 230, 240 and the second pressing tool 260.

As shown in FIG. 3, the first cleaning module further comprises a first tightening roller 150 adapted to adjust a tension of the first cleaning belt. For example, the tension of the first cleaning belt may be adjusted by fixing the first tightening roller 150 at different positions. Similarly, the second cleaning module further comprises a second tightening roller 250 adapted to adjust a tension of the second cleaning belt. For example, the tension of the second cleaning belt may be adjusted by fixing the second tightening roller 250 at different positions.

As shown in FIG. 3, the first cleaning module is mounted on a first mounting plate 100 and the second cleaning module is mounted on a second mounting plate 200. In the shown embodiment, the first mounting plate 100 and the second mounting plate 200 are arranged to be movable relative to each other, so that the first pressing tool 160 and the second pressing tool 260 are movable relative to each other to loose or clamp the optical fiber 22. The sprayer 300 is mounted on the first mounting plate 100.

The first mounting plate 100 and the second mounting plate 200 are movably mounted on the same vertical stationary baseplate 1000 in the shown embodiment, and the first mounting plate 100 is located right above the second mounting plate 200. A rail 1100 extending vertically is arranged on the stationary baseplate 1000. A first slider 101 is arranged on the first mounting plate 100 and slidably engaged with the rail 1100 so as to move upward and downward along the rail 1100. A second slider 201 is arranged on the second mounting plate 200 and slidably engaged with the rail 1100 so as to move upward and downward along the rail 1100. The automatic fiber cleaning system may further comprise a plate driving mechanism adapted to drive the first mounting plate 100 to move with respect to the stationary baseplate 1000, so as to allow the first pressing tool 160 mounted on the first mounting plate 100 to be movable relative to the second pressing tool 260 mounted on the second mounting plate 200.

Figure 4:
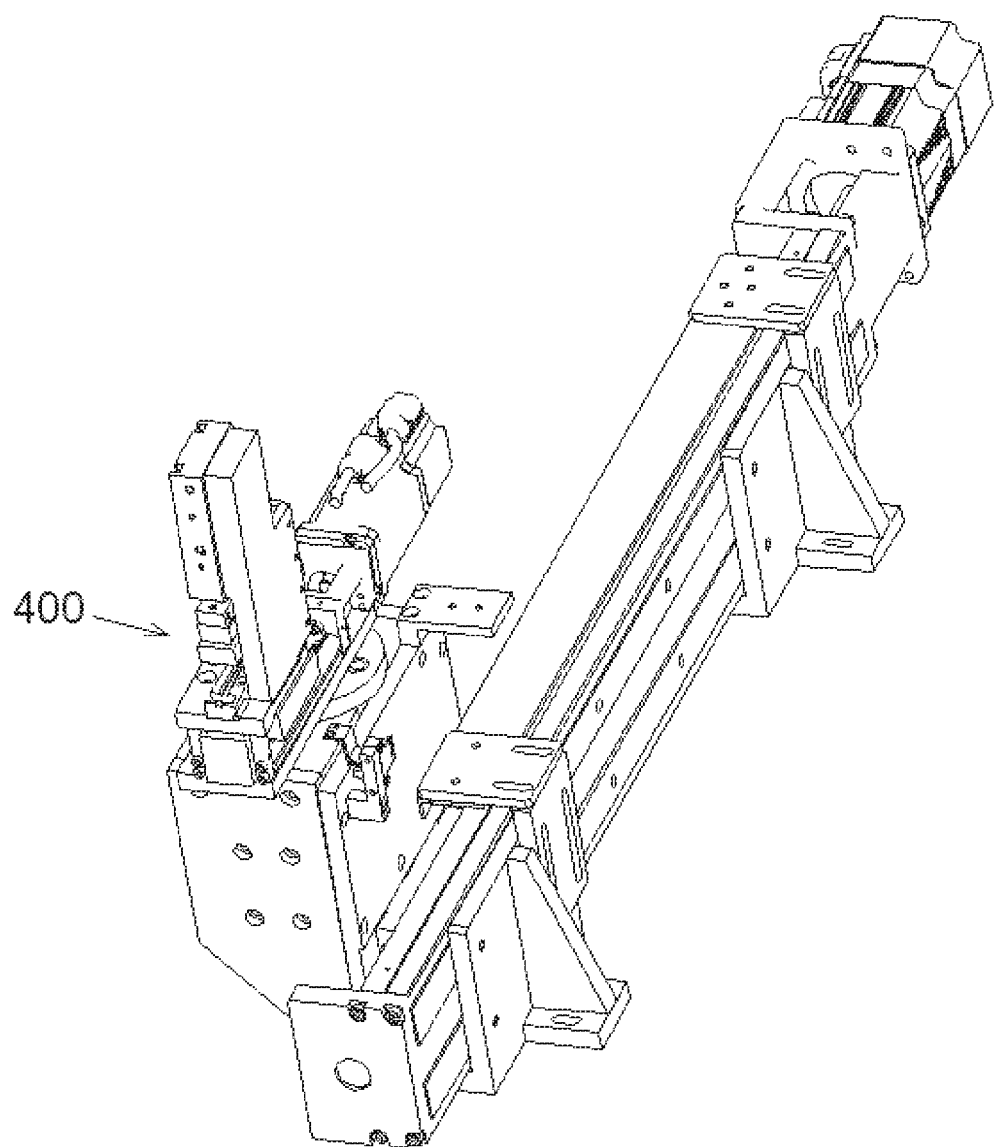
FIG. 4 is a perspective view of a fiber carrying mechanism of the automatic fiber cleaning system.

The automatic fiber cleaning system has a fiber carrying mechanism 400 shown in FIG. 4. The fiber carrying mechanism 400 is adapted to place the optical fiber 22 to be cleaned on the second cleaning belt located right above the second pressing tool 260 and to move the cleaned optical fiber 22 out of the second pressing tool 260.

The fiber carrying mechanism 400, as shown in FIG. 4, comprises a carrier movable in a first direction, a second direction and a third direction which are perpendicular to each other. The optical fiber 22 may be held and fixed in a clamp of the fiber carrying mechanism 400. In other embodiments, the fiber carrying mechanism 400 may also comprise a manipulator or a robot which is adapted to hold and move the optical fiber 22. The optical fiber 22 is kept stationary by the fiber carrying mechanism 400 during wiping the optical fiber 22 with the first cleaning belt and the second cleaning belt.

A method of automatically cleaning fibers using the automatic fiber cleaning system will now be described with reference to FIGS. 1-4. The automatic fiber cleaning method comprises the steps of:

moving the first mounting plate 100 upward to separate the first pressing tool 160 and the second pressing tool 260, so as to separate the first tightened cleaning belt and the second tightened cleaning belt;

fixing an optical cable 20 to be cleaned on the fiber carrying mechanism 400;

placing the optical fiber 22 to be cleaned on the second cleaning belt located right above the second pressing tool 260 using the fiber carrying mechanism 400;

driving the first mounting plate 100 to move downward so as to clamp the optical fiber 22 to be cleaned between the first tightened cleaning belt and the second tightened cleaning belt;

switching on the sprayer 300 to spray the cleaning agent onto the first tightened cleaning belt and the second tightened cleaning belt;

driving the first cleaning belt and the second cleaning belt to move so as to wipe the optical fiber 22 with the first wet cleaning belt and the second wet cleaning belt having the cleaning agent;

switching off the sprayer 300 to stop supplying the cleaning agent onto the first tightened cleaning belt and the second tightened cleaning belt;

moving the first mounting plate 100 upward to separate the first tightened cleaning belt from the second tightened cleaning belt; and removing the cleaned optical fiber 22 using the fiber carrying mechanism 400.

In various embodiments, the method of automatically cleaning fibers using the automatic fiber cleaning system may further comprise, after switching off the sprayer 300, wiping the optical fiber 22 continuously with the first dry cleaning belt and the second dry cleaning belt without the cleaning agent for a predetermined period. In an embodiment, the optical fiber 22 is kept stationary by the fiber carrying mechanism 400 during wiping the optical fiber 22 with the first cleaning belt and the second cleaning belt. In the shown embodiments, the cleaned optical fibers comprise a plurality of bare fibers 22 of a ribbon cable 20, however, in other embodiments, the cleaned optical fibers may also comprise a single fiber of round cable.

What is claimed is:

1. An automatic fiber cleaning system, comprising:
   a first mounting plate and a second mounting plate arranged to be movable relative to each other;
   a first cleaning module mounted on the first mounting plate and having
   a first cleaning belt;
   a first driven belt wheel on which an unused portion of the first cleaning belt is wound;

a first driving belt wheel on which a used portion of the first cleaning belt is wound; and
a first pressing tool on which the first cleaning belt is tightened;
a second cleaning module mounted on the second mounting plate and having
a second cleaning belt;
a second driven belt wheel on which an unused portion of the second cleaning belt is wound;
a second driving belt wheel on which a used portion of the second cleaning belt is wound; and
a second pressing tool on which the second cleaning belt is tightened and movable relative to the first pressing tool; and
a sprayer configured to spray a cleaning agent onto the first cleaning belt tightened on the first pressing tool and the second cleaning belt tightened on the second pressing tool, the first pressing tool and the second pressing tool pressing the first cleaning belt and the second cleaning belt on both sides of an optical fiber and clamping the optical fiber between the first cleaning belt and the second cleaning belt, the first cleaning belt and the second cleaning belt driven to move relative to the optical fiber by the first driving belt wheel and the second driving belt wheel to wipe the optical fiber.

2. The automatic fiber cleaning system of claim 1, wherein the first cleaning module has a first sensor adapted to detect whether the first cleaning belt has any unused portion and the second cleaning module has a second sensor adapted to detect whether the second cleaning belt has any unused portion.

3. The automatic fiber cleaning system of claim 2, wherein the first cleaning module has a pair of first rollers positioned on opposite sides of the first pressing tool, the first cleaning belt being tightened on the pair of first rollers and the first pressing tool, and the second cleaning module has a pair of second rollers positioned on opposite sides of the second pressing tool, the second cleaning belt being tightened on the pair of second rollers and the second pressing tool.

4. The automatic fiber cleaning system of claim 3, wherein the first cleaning module has a first tightening roller adapted to adjust a tension of the first cleaning belt and the second cleaning module has a second tightening roller adapted to adjust a tension of the second cleaning belt.

5. The automatic fiber cleaning system of claim 4, wherein the first mounting plate and the second mounting plate are movably mounted on a same vertical stationary baseplate.

6. The automatic fiber cleaning system of claim 5, wherein the first mounting plate is disposed above the second mounting plate.

7. The automatic fiber cleaning system of claim 5, wherein the stationary baseplate has a rail, the first mounting plate has a first slider slidably engaged with the rail so as to move upward and downward along the rail, and the second mounting plate has a second slider slidably engaged with the rail so as to move upward and downward along the rail.

8. The automatic fiber cleaning system of claim 7, wherein the sprayer is mounted on the first mounting plate.

9. The automatic fiber cleaning system of claim 8, further comprising a fiber carrying mechanism adapted to position the optical fiber on the second pressing tool and move the optical fiber off of the second pressing tool.

10. The automatic fiber cleaning system of claim 7, further comprising a plate driving mechanism adapted to drive the first mounting plate and move the first pressing tool relative to the second pressing tool.

11. An automatic fiber cleaning method, comprising:
providing an optical fiber cleaning system having:
a first cleaning module having:
a first cleaning belt;
a first driven belt wheel on which an unused portion of the first cleaning belt is wound;
a first driving belt wheel on which a used portion of the first cleaning belt is wound; and
a first pressing tool on which the first cleaning belt is tightened;
a second cleaning module having
a second cleaning belt;
a second driven belt wheel on which an unused portion of the second cleaning belt is wound;
a second driving belt wheel on which a used portion of the second cleaning belt is wound; and
a second pressing tool on which the second cleaning belt is tightened;
a sprayer;
a first mounting plate on which the first cleaning module is mounted; and
a second mounting plate on which the second cleaning module is mounted and arranged to be movable relative to the first mounting plate such that the second pressing tool is movable relative to the first pressing tool;
clamping an optical fiber between the first tightened cleaning belt and the second tightened cleaning belt;
spraying a cleaning agent using the sprayer onto the first tightened cleaning belt and the second tightened cleaning belt;
driving the first cleaning belt with the first driving belt wheel and the second cleaning belt with the second driving belt wheel to move so as to wipe the optical fiber with the first cleaning belt and the second cleaning belt each having the cleaning agent;
stopping the supply of the cleaning agent onto the first tightened cleaning belt and the second tightened cleaning belt;
separating the first tightened cleaning belt from the second tightened cleaning belt; and
removing the optical fiber.

12. The automatic fiber cleaning method of claim 11, further comprising, after stopping the supply of the cleaning agent, wiping the optical fiber continuously with the first cleaning belt and the second cleaning belt each without the cleaning agent for a predetermined period.

13. The automatic fiber cleaning method of claim 11, wherein the optical fiber is kept stationary during wiping of the optical fiber with the first cleaning belt and the second cleaning belt.

* * * * *